United States Patent
Itabashi et al.

(10) Patent No.: US 8,282,908 B2
(45) Date of Patent: Oct. 9, 2012

(54) ZEOLITE BETA AND PROCESS FOR PRODUCING THE SAME

(75) Inventors: Keiji Itabashi, Tokyo (JP); Tatsuya Okubo, Tokyo (JP); Yoshihiro Kamimura, Tokyo (JP); Watcharop Chaikittisilp, Tokyo (JP); Shanmugam Palani Elangovan, Tokyo (JP)

(73) Assignees: Nippon Chemical Industrial Co., Ltd., Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 13/387,631

(22) PCT Filed: Jul. 21, 2010

(86) PCT No.: PCT/JP2010/062270
§ 371 (c)(1),
(2), (4) Date: Apr. 9, 2012

(87) PCT Pub. No.: WO2011/013560
PCT Pub. Date: Feb. 3, 2011

(65) Prior Publication Data
US 2012/0190534 A1 Jul. 26, 2012

(30) Foreign Application Priority Data

Jul. 27, 2009 (JP) ................. 2009-174691
Nov. 20, 2009 (JP) ................. 2009-264551
Jul. 7, 2010 (JP) ................. 2010-154510

(51) Int. Cl.
*C01B 39/46* (2006.01)
(52) U.S. Cl. ......................... 423/709; 502/60
(58) Field of Classification Search .............. 423/709; 502/60
See application file for complete search history.

(56) References Cited

U.S. PATENT DOCUMENTS

| 3,308,069 A | 3/1967 | Wadlinger |
| 4,923,690 A | 5/1990 | Valyocsik et al. |
| 5,164,170 A | 11/1992 | Rubin |
| 7,704,487 B2 | 4/2010 | Breuninger |
| 2010/0003178 A1 | 1/2010 | Tokunaga et al. |
| 2010/0322847 A1* | 12/2010 | Xiao et al. ............ 423/709 |

FOREIGN PATENT DOCUMENTS

| CN | 101249968 A | 8/2008 |
| JP | 61-10022 A | 1/1986 |
| JP | 2008-81348 A | 4/2008 |
| JP | 2008-519748 A | 6/2008 |

OTHER PUBLICATIONS

International Search Report of PCT/JP2010/062270, mailing date Oct. 5, 2010.
Borade et al., "Preparation of aluminum-rich Beta zeolite", Elsevier, Microporous Materials 5, 1996, pp. 289-297.
Xie et al., "Organotemplate-Free and Fast Route for Synthesizing Beta Zeolite", Chemistry of Materials, vol. 20, No. 14, Jul. 22, 2008, pp. 4533-4535.
Ch. Baerlocher et al., Atlas of Zeolite Framework Types, Published on behalf of the Commission of the International Association, 2007, pp. 72-73.
M.M.J. Treacy et al., Collection of Simulated XRD Powder Patterns for Zeolites, Published on behlaf of the Commission of the International Zeolite Association, 2007, (3 pages).

* cited by examiner

*Primary Examiner* — David M Brunsman
(74) *Attorney, Agent, or Firm* — Westerman, Hattori, Daniels & Adrian, LLP

(57) ABSTRACT

A zeolite beta according to the present invention has a $SiO_2/Al_2O_3$ ratio of 10 to 16 and is aluminum-rich. The zeolite beta has a BET specific surface area measured in the state of a sodium type of 500 to 700 $m^2/g$, a micropore specific surface area of 350 to 500 $m^2/g$, and a micropore volume of 0.15 to 0.25 $cm^3/g$.

7 Claims, 15 Drawing Sheets

ZEOLITE BETA AND PROCESS FOR PRODUCING THE SAME

TECHNICAL FIELD

The present invention relates to a zeolite beta and a process for producing a zeolite beta without using an organic compound as a structure directing agent.

BACKGROUND ART

Synthetic zeolites are crystalline aluminosilicate, and have uniform pores of a size in angstrom attributed to the crystal structure of each zeolite. Utilizing the characteristic, the synthetic zeolites have been industrially used as molecular sieve adsorbents for adsorbing only molecules having a specific size, adsorption separating agents for adsorbing highly affinitive molecules, and catalyst base. One of such zeolites, i.e., zeolite beta is abundantly used in the world as a catalyst in the petroleum chemical industry and an adsorbent for treating automobile exhaust gas. The characteristic of the zeolite beta is that the zeolite beta has pores of a 12-membered ring in a three-dimensional direction as described in Non Patent Literature 1 below. Moreover, the X-ray diffraction diagram showing the structural characteristics is described in Non Patent Literature 2 below.

A variety of processes for synthesizing a zeolite beta has been proposed. A general process uses tetraethylammonium ion as a structure directing agent (hereinafter abbreviated to an "SDA."). Such a process is described in Patent Literature 1 and 3 and Non Patent Literature 3 below, for example. According to these processes, the zeolite beta having a $SiO_2/Al_2O_3$ ratio 10 to 400 is obtained. Unfortunately, a compound containing tetraethylammonium ion is expensive, and most of it is decomposed after crystallization of the zeolite beta is completed. For this reason, the compound cannot be recovered and reused. For this reason, the zeolite beta produced by the process is expensive. Further, because tetraethylammonium ions are taken into crystals, the tetraethylammonium ions need to be calcined and removed when the zeolite beta produced by the process is used as an adsorbent or a catalyst. The exhaust gas in the calcination causes environmental pollution, and many chemicals are needed for the treatment for detoxifying a synthesis mother solution. Thus, the process for synthesizing a zeolite beta using tetraethylammonium ion is a production process that costs high and impose a large environmental load. Accordingly, realization of a production process without using the SDA has been desired.

In such a circumstance, Non Patent Literature 4 has recently proposed a process for synthesizing a zeolite beta with using no organic SDA. In the process, the zeolite beta synthesized using tetraethylammonium ion is calcined to remove an organic component, and the obtained product is used as a seed crystal. The seed crystal is added to a sodium aluminosilicate reaction mixture containing no organic substance, and a hydrothermal treatment is performed. Thus, crystallization is performed. In the process, however, because the zeolite beta synthesized using tetraethylammonium ion is calcined and the obtained product is used as a seed crystal, the amount of the SDA to be used is reduced while the tetraethylammonium ion as the SDA is always needed. Moreover, according to the process, the kind of the seed crystal is only one, and only one example of the composition of the sodium aluminosilicate reaction mixture is shown in which the numeric values are limited. Accordingly, although the composition of the synthesized zeolite beta is not clearly described, it is thought that the values of the composition are only determined ones.

On the other hand, Patent Literature 4 written by the author of Non Patent Literature 4 discloses a $SiO_2/Al_2O_3$ ratio in a seed crystal and describes that the composition of a sodium aluminosilicate reaction mixture is not a point composition but in a narrow range from the point composition. Unfortunately, the disclosure of Patent Literature 4 is basically the same technique as the content of Non Patent Literature 4. The range of the composition of the reaction mixture is so narrow that the $SiO_2/Al_2O_3$ ratio of the zeolite beta is limited to only a limited range. In order to deal with a variety of demands, a zeolite having a wide range of the $SiO_2/Al_2O_3$ ratio is desired. Moreover, establishment of a condition allowing synthesis by stirring is desired for industrial mass production. Further, in order to reduce the environmental load as much as possible, a proposal of a new process for producing a zeolite beta is desired, in which a seed crystal not needed to be calcined is used and no organic SDA is used.

CITATION LIST

Patent Literature

Patent Literature 1: U.S. Pat. No. 3,308,069
Patent Literature 2: U.S. Pat. No. 4,923,690
Patent Literature 3: U.S. Pat. No. 5,164,170
Patent Literature 4: China Patent Application No. 101249968A

Non Patent Literature

Non Patent Literature 1: Ch. Baerlocher, L. B. McCusker, D. H. Olson, Atlas of Zeolite Framework Types, Published on behalf of the Commission of the International Zeolite Association, 2007, p. 72-73
Non Patent Literature 2: M. M. J. Treacy and J. B. Higgins, Collection of Simulated XRD Powder Patterns for Zeolites, Published on behalf of the Commission of the International Zeolite Association, 2007, p. 82-83 and p. 480
Non Patent Literature 3: Microporous Materials, Vol. 5, p. 289-297 (1996)
Non Patent Literature 4: Chemistry of Materials, Vol. 20, No. 14, p. 4533-4535 (2008)

SUMMARY OF INVENTION

Technical Problem

An object of the present invention is to eliminate disadvantages of the conventional art described above and to provide a zeolite beta having a wide range of a $SiO_2/Al_2O_3$ ratio, particularly a zeolite beta having a low $SiO_2/Al_2O_3$ ratio, to establish a condition allowing synthesis by stirring for industrial mass production, and to provide a process for producing a zeolite beta without using an organic SDA that can reduce environmental load as much as possible.

Solution to Problem

As a result of extensive research, the present inventors have found out that the object is achieved by producing a zeolite beta according to a specific production procedure.

Namely, the present invention provides a zeolite having a $SiO_2/Al_2O_3$ ratio of 10 to 16, wherein a BET specific surface area measured in a state of a sodium type is 500 to 700 m²/g, a micropore specific surface area is 350 to 500 m²/g, and a micropore volume is 0.15 to 0.25 cm³/g.

Moreover, as a suitable process for producing the zeolite beta, the present invention provides a process for producing a zeolite beta, comprising the steps of: (1) mixing a silica source, an alumina source, an alkali source, and water to obtain a reaction mixture having a composition represented by molar ratios shown below:

$SiO_2/Al_2O_3$=40 to 200
$Na_2O/SiO_2$=0.22 to 0.4
$H_2O/SiO_2$=10 to 50, (2) adding a zeolite beta having a $SiO_2/Al_2O_3$ ratio of 8 to 30 and containing no organic compound whose average particle size is not less than 150 nm used as a seed crystal to the reaction mixture in a proportion of 0.1 to 20% by weight based on the silica component in the reaction mixture, and
(3) hermetically heating the reaction mixture containing the seed crystal added to 100 to 200° C.

Advantageous Effects of Invention

According to the present invention, a zeolite beta having a large BET specific surface area, a large micropore specific surface area, and a large micropore volume is provided, even though the $SiO_2/Al_2O_3$ ratio is low. Moreover, according to the production process according to the present invention, the zeolite beta having a wide range of the $SiO_2/Al_2O_3$ ratio can be easily obtained. Further, according to the production process according to the present invention, use of the organic SDA is eliminated as much as possible and the environmental load can be reduced as much as possible in the production of the zeolite beta.

DESCRIPTION OF EMBODIMENTS

Figure 1:
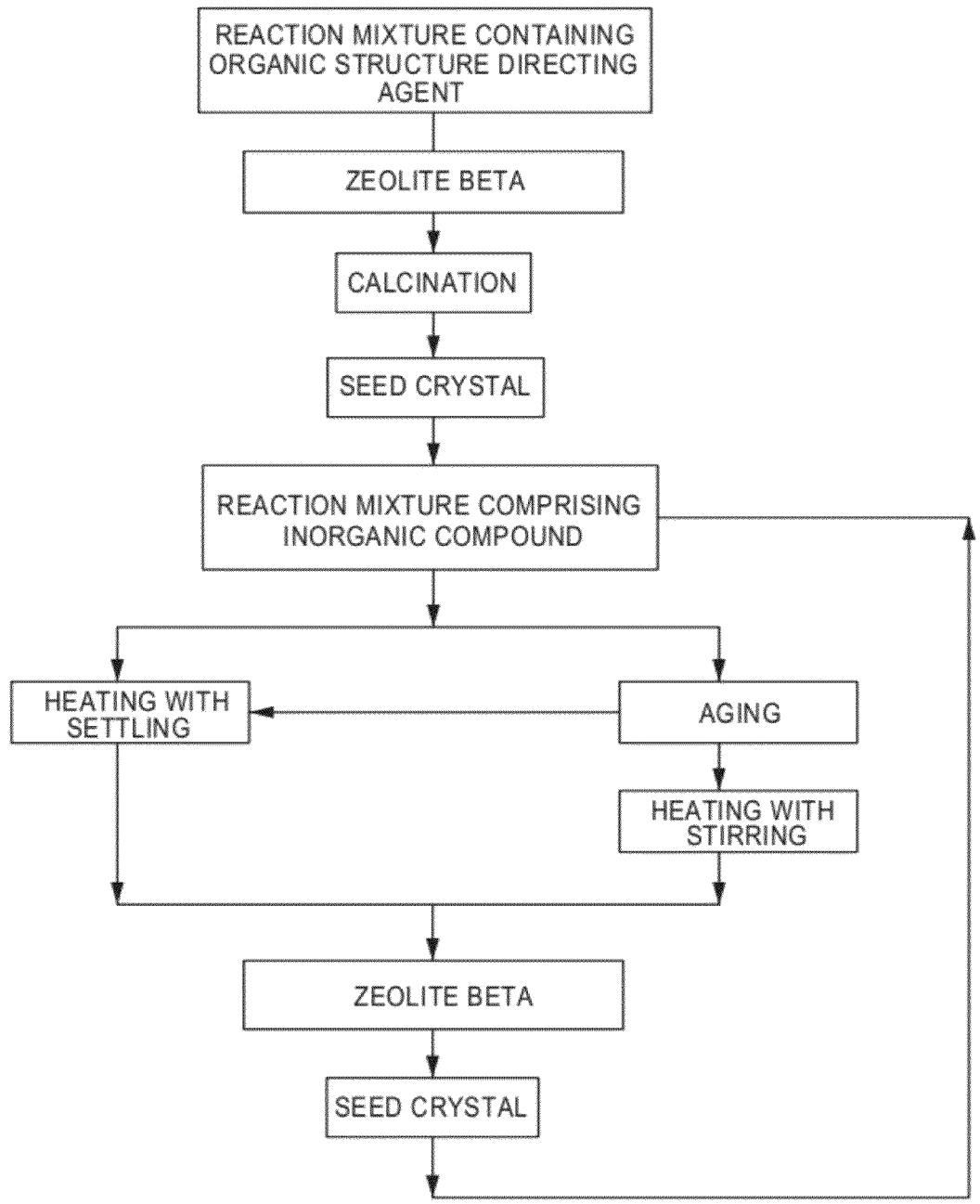
FIG. 1 is a process chart for implementing a production process according to the present invention.

Hereinafter, the present invention will be described according to the preferred embodiments. As one of the characteristics, the zeolite beta according to the present invention has a large BET specific surface area, a large micropore specific surface area, and a large micropore volume while the zeolite beta has a low $SiO_2/Al_2O_3$ ratio and is aluminum-rich. Although a zeolite beta having a low $SiO_2/Al_2O_3$ ratio is known, the BET specific surface area, the micropore specific surface area, and the micropore volume of the zeolite beta is not large. If the BET specific surface area, the micropore specific surface area, and the micropore volume are made larger in the conventionally known zeolite beta, the $SiO_2/Al_2O_3$ ratio is inevitably made larger.

The zeolite beta according to the present invention has a $SiO_2/Al_2O_3$ ratio of 10 to 16, preferably 10 to 14, and is aluminum-rich. Such an aluminum-rich zeolite beta according to the present invention has a large BET specific surface area measured in the state of the sodium type, i.e., 500 to 700 m²/g and preferably 550 to 700 m²/g. The zeolite beta according to the present invention has a large micropore specific surface area measured in the state of the sodium type, i.e., 350 to 500 m²/g and preferably 380 to 500 m²/g. Additionally, the zeolite beta according to the present invention has a large micropore volume measured in the state of the sodium type, i.e., 0.15 to 0.25 cm³/g and preferably 0.18 to 0.25 cm³/g.

The zeolite beta according to the present invention includes the sodium type zeolite, and further includes an $H^+$ type zeolite in which sodium ion is ion-exchanged with a proton. In the case where the zeolite beta is the $H^+$ type, the measurement of the specific surface area and the like are performed after the proton is substituted by sodium ion. To convert the sodium type zeolite beta to the $H^+$ type, for example, the sodium type zeolite beta is dispersed in an aqueous solution of an ammonium salt such as ammonium nitrate, and the sodium ion in the zeolite is substituted by ammonium ion. The ammonium type zeolite beta is calcined to obtain the $H^+$ type zeolite beta.

The specific surface area and the volume described above are measured using a BET specific surface area measuring apparatus as described later in Examples.

The aluminum-rich zeolite beta according to the present invention having the physical properties above is suitably produced by a production process described later. It is presumed that the reason that the physical properties above are achieved in the present invention is that use of the production process can suppress defects to be produced in the crystal structure of the zeolite beta to be obtained, although the detail is not clear. Utilizing the physical properties, the zeolite beta according to the present invention is particularly suitably used as catalysts for purging exhaust gas from internal combustion engines such as gasoline engines and diesel engines, adsorption separating agents in a variety of industrial fields, and catalysts for petroleum chemical industry, for example.

Particularly, the zeolite beta according to the present invention has a high ability to trap hydrocarbons discharged at the time of cold start of the internal combustion engine and discharge the trapped hydrocarbons, as verified in Examples described later. At the time of cold start of the gasoline engine and the diesel engine, the temperature of a three-way catalyst is not sufficiently high, and it is difficult to effectively purge the exhaust gas with the three-way catalyst. Using a catalyst containing the zeolite beta according to the present invention separately from the three-way catalyst, the exhaust gas at the time of the cold start can be trapped by the catalyst to suppress discharge of the exhaust gas. When several minutes pass from the cold start and the temperature reaches in the vicinity of the operating temperature of the three-way catalyst, the hydrocarbons trapped by the catalyst containing zeolite beta according to the present invention are discharged. The discharged hydrocarbons are purged by the three-way catalyst whose temperature reaches the operating temperature. As verified in Examples described later, surprisingly, the ability of the zeolite beta according to the present invention to trap hydrocarbons is higher after the zeolite beta is subjected to a hydrothermal treatment than that immediately after the zeolite beta is synthesized. For this reason, reduction in the ability to trap hydrocarbons, which is caused by the heat applied to the catalyst after the cold start, is efficiently prevented. In the case where the zeolite beta according to the present invention is used as the catalyst for purging exhaust gas, the zeolite beta is preferably used in the state of the $H^+$ type.

Next, a suitable process for producing a zeolite beta according to the present invention will be described with reference to FIG. 1. The production process is suitable for production of the zeolite beta according to the present invention, and can also be used for production of the zeolite having a beta structure other than the zeolite beta according to the present invention without particular limitation. In FIG. 1, the conventional process for synthesizing a zeolite beta using an organic SDA is performed in the order of <1>, <2>, and <3>. Moreover, the process described in Patent Literature 4 and Non Patent Literature 4 is performed in the order of <1>, <2>, <3>, <4>, <5>, <6>, and <9>. In the process according to Patent Literature 4 and Non Patent Literature 4, use of the seed crystal is essential, and the SDA tetraethylammonium ion is essential for production of the seed crystal. Moreover, in order to use the zeolite beta obtained by the process described in Patent Literature 4 and Non Patent Literature 4 as the seed crystal, the zeolite beta needs to be calcined at a high temperature to remove tetraethylammonium ions.

Contrary to the process, six patterns of the production process are available in the present invention. A first process is a process in which the steps are performed in the order of <1>, <2>, <3>, <4>, <5>, <6>, and <9> in the same way as that in the process described in Patent Literature 4 or the like. The $SiO_2/Al_2O_3$ ratio in the seed crystal and the composition of the reaction mixture are different from those in the process described in Patent Literature 4 and Non Patent Literature 4. Hence, according to the present invention, the zeolite beta having a wide range of $SiO_2/Al_2O_3$ ratio can be produced. A second process is a process in which the steps are performed in the order of <1>, <2>, <3>, <4>, <5>, <7>, <6>, and <9>. In the process, the zeolite beta is aged, and heated while it is settled. Thereby, the seed crystal having a low $SiO_2/Al_2O_3$ ratio can be effectively used. The operation of aging is not described in Patent Literature 4 and Non Patent Literature 4.

A third process is a process in which the steps are performed in the order of <1>, <2>, <3>, <4>, <5>, <7>, <8>, and <9>. In the process, the $SiO_2/Al_2O_3$ ratio in the seed crystal and the composition of the reaction mixture are different from those in the process described in Patent Literature 4 and Non Patent Literature 4. Moreover, the operations of aging and stirring performed in the process are not described in Patent Literature 4 and Non Patent Literature 4. The operations of aging and stirring are new processes needed for mass production of the zeolite beta. The reason is that a large-sized pressurized container is necessary for mass production, and the stirring operation is necessary in order to keep the inner temperature of such a pressurized container uniform. However, if stirring is performed without the aging operation, the purity of the zeolite beta is likely to be reduced by production of impurities.

In the production process according to the present invention, the following three patterns of the order are also available.

<10>, <5>, <6>, and <9>
<10>, <5>, <7>, <6>, and <9>
<10>, <5>, <7>, <8>, and <9>

In these cases, the $SiO_2/Al_2O_3$ ratio in the seed crystal and the composition of the reaction mixture are different from the process described in Patent Literature 4 and Non Patent Literature 4. Additionally, in these three patterns of the process, the zeolite beta obtained by the process according to the present invention is used as the seed crystal to be used. Namely, in the three patterns of the production processes, the seed crystal can be repeatedly used, and no organic SDA is essentially used. In short, it can be said that the three patterns of the production process are the process for producing a zeolite beta by a green process in which the environmental load is ultimately small. A "green zeolite beta" is produced by these production processes for the first time.

The process according to the present invention will be further described in detail. The process in which the steps are performed in the order of <1>, <2>, and <3> in FIG. 1 is the same as the conventional process using the organic SDA, and the process and condition are as those disclosed in much known information such as Patent Literatures 1 to 3 and Non Patent Literature 3.

For the seed crystal in <4> in FIG. 1, the $SiO_2/Al_2O_3$ ratio is limited in a narrow range of 22 to 25 in Patent Literature 4. Contrary to this, one of the characteristics of the present invention is the $SiO_2/Al_2O_3$ ratio in the seed crystal shown in <4> in FIG. 1. Non Patent Literature 3 describes a process for synthesizing a zeolite beta having a $SiO_2/Al_2O_3$ ratio=10 or more using an SDA. Contrary to this, the seed crystal having the $SiO_2/Al_2O_3$ ratio=8 to 30 can be used in the process according to the present invention. It is extremely difficult to synthesize a zeolite beta having a $SiO_2/Al_2O_3$ ratio of less than 8 as the seed crystal, and such a zeolite beta is not usually used. When a $SiO_2/Al_2O_3$ ratio of the seed crystal exceeds 30, the product is independent of the composition of the reaction mixture and is likely to become ZSM-5. The amount of the seed crystal to be added in the present invention is in the range of 0.1 to 20% by weight based on the silica component contained in the reaction mixture. The amount of the seed crystal to be added is preferably smaller, but determined in consideration of a reaction rate and an effect of suppressing impurities. A preferable amount of the seed crystal to be added is 1 to 20% by weight, and a more preferable amount to be added is 1 to 10% by weight.

The average particle size of the zeolite beta seed crystal used in the production process according to the present invention is not less than 150 nm, preferably 150 to 1000 nm, and more preferably 200 to 600 nm. Usually, the size of the crystal of the zeolite obtained by synthesis is not uniform, and has a certain degree of particle size distribution. It is not difficult to determine the particle size of the crystal having the highest frequency in the distribution. The average particle size refers to a particle diameter of the crystal having the highest frequency in observation by a scanning electron microscope. Usually, the average particle size of the zeolite beta produced using an organic SDA is small, and in the range of 100 nm to 1000 nm. However, because small particles aggregate, the particle diameter of the crystal is unclear, or crystals having a particle diameter more than 1000 nm exist. Moreover, a special artifice is necessary in order to synthesize the crystal having a particle diameter of not more than 100 nm, and the cost is high. Accordingly, in the present invention, the zeolite beta having the average particle size of not less than 150 nm is used as the seed crystal. Because the zeolite beta obtained by the process according to the present invention also has the average particle size in this range, it can be suitably used as the seed crystal.

The reaction mixture containing the seed crystal added is obtained by mixing a silica source, an alumina source, an alkali source, and water to have a composition represented by molar ratios shown below. If the composition of the reaction mixture is out of this range, a target zeolite beta cannot be obtained.

$SiO_2/Al_2O_3$=40 to 200
$Na_2O/SiO_2$=0.22 to 0.4
$H_2O/SiO_2$=10 to 50

A more preferable composition of the reaction mixture is in the range below.

$SiO_2/Al_2O_2$=44 to 200
$Na_2O/SiO_2$=0.24 to 0.35
$H_2O/SiO_2$=15 to 25

In Patent Literature 4 and Non Patent Literature 4, the $SiO_2/Al_2O_3$ ratio of the zeolite beta to be produced is not described. Because the $SiO_2/Al_2O_3$ ratio of the reaction mixture is limited to a narrow range, it is thought that the $SiO_2/Al_2O_3$ ratio of the zeolite beta to be produced is also a value in a narrow range. Contrary to this, in the process according to the present invention, the reaction mixture having a wide range of $SiO_2/Al_2O_3$ ratio is used. Accordingly, the $SiO_2/Al_2O_3$ ratio of the zeolite beta to be produced is in a wider range. Of course, the zeolite beta having a low $SiO_2/Al_2O_3$ ratio can be obtained.

Examples of the silica source used to obtain the reaction mixture having the molar ratios include silica itself and silicon-containing compounds that enable production of silicic acid ions in water. Specifically, examples of the silica source include wet silica, dry silica, colloidal silica, sodium silicate, and aluminosilicate gel. One of these silica sources can be used alone, or two or more thereof can be used in combination. Among these silica sources, use of silica (silicon dioxide) is preferred because the zeolite can be obtained without an unnecessary byproduct.

As the alumina source, a water soluble aluminum-containing compound can be used, for example. Specifically, examples of the alumina source include sodium aluminate, aluminum nitrate, and aluminum sulfate. Aluminum hydroxide is one of the suitable alumina sources. One of these alumina sources can be used alone, or two or more thereof can be used in combination. Among these alumina sources, use of sodium aluminate and aluminum hydroxide is preferred because the zeolite can be obtained without an unnecessary byproduct (such as sulfuric acid salt and nitric acid salt).

As the alkali source, sodium hydroxide can be used, for example. In the case where sodium silicate is used as the silica source and sodium aluminate is used as the alumina source, sodium, i.e., an alkali metal component contained therein is considered as NaOH at the same time, and is also an alkali component. Accordingly, the molar ratio of the $Na_2O$ is calculated as the sum of all the alkali components in the reaction mixture.

The order of adding the respective raw materials during the preparation of the reaction mixture may be any order in which a uniform reaction mixture is easily obtained. For example, the alumina source is added to a sodium hydroxide aqueous solution and dissolved at room temperature; the silica source is then added to the mixed solution and stirred. Thereby, a uniform reaction mixture can be obtained. The seed crystal is added while the seed crystal is mixed with the silica source, or added after the silica source is added. Subsequently, the seed crystal is stirred and mixed to be uniformly dispersed. The temperature at the time of preparing the reaction mixture is not particularly limited, and usually the preparation may be performed at room temperature (20 to 25° C.).

The reaction mixture containing the seed crystal is placed in a sealed container, and heated to react. Thus, the zeolite beta is crystallized. The reaction mixture contains no organic SDA. One of the processes for crystallization is heating with settling without aging (the procedure of <4>, <5>, <6>, and <9>) as described in Patent Literature 4 and Non Patent Literature 4.

On the other hand, in the case where the seed crystal having a low $SiO_2/Al_2O_3$ ratio is used, the crystallization progresses more easily by aging and subsequent heating without stirring (the procedure of <4>, <5>, <7>, <6>, and <9>). The aging refers to an operation to keep the reaction mixture at a temperature lower than the reaction temperature for a fixed period of time. In the aging, usually, the reaction mixture is settled without stirring. It is known that various effects are obtained by the aging, for example, by-production of impurities is prevented, heating under stirring is enabled without by-production of impurities, and the reaction rate is increased, although an action mechanism is not always clear. The temperature and time for the aging are set such that the effects are demonstrated in the maximum. In the present invention, the aging is performed at a temperature of preferably 20 to 80° C. and more preferably 20 to 60° C. and a time preferably in the range of 2 hours to one day.

In the case where stirring is performed during heating in order to make the temperature of the reaction mixture uniform, by-production of impurities can be prevented by stirring by heating after aging (the procedure of <4>, <5>, <7>, <8>, and <9>). Stirring is performed in order to make the composition of the reaction mixture and the temperature thereof uniform, and examples of stirring include mixing using a stirring blade and mixing by rotation of a container. Strength of stirring and the number of rotation may be adjusted according to the uniformity of the temperature and a degree of impurities by-produced. Instead of continuous stirring, intermittent stirring may be used. Thus, a combination of aging with stirring enables industrial mass production.

The three patterns of the process described below are a process for producing a zeolite beta by the green process, which is one of the characteristics of the present invention. According to the three patterns of the process, endless self reproduction using the zeolite beta obtained by the present invention as the seed crystal is enabled, and the production process using no organic SDA can be provided. Namely, these are the process in which the steps are performed in the order of <10>, <5>, <6>, and <9>; the process in which the steps are performed in the order of <10>, <5>, <7>, <6>, and <9>; and the process in which the steps are performed in the order of <10>, <5>, <7>, <8>, and <9>. The characteristics of the respective steps are as follows. The $SiO_2/Al_2O_3$ ratio of the zeolite beta obtained by the present invention is preferably in the range of 8 to 30. In the case where the zeolite beta obtained by the present invention is used as the seed crystal and synthesis by settling is used, the zeolite beta can be crystallized without the aging operation in spite of a low $SiO_2/Al_2O_3$ ratio. In the case where the zeolite beta synthesized using the organic SDA is used as the seed crystal, the zeolite beta is calcined and used. The calcination is unnecessary in the case where the zeolite beta obtained by the present invention is used as the seed crystal. It is presumed that the difference is realized as the difference in the effect of the seed crystal, although the detail is not clear. Preferably, however, aging is performed in the case where heating with stirring is performed.

In both the settling method and the stirring method, the heating temperature is in the range of 100 to 200° C., and preferably in the range of 120 to 180° C., and heating is performed under autogenous pressure. At a temperature less than 100° C., the crystallization rate is excessively low, and the production efficiency of the zeolite beta is reduced. On the other hand, at a temperature more than 200° C., an autoclave having strength with high pressure resistance is necessary, leading to an economical disadvantage. Further, the rate of impurities to be produced is higher. In the present production process, the heating time is not critical. Heating may be performed until a zeolite beta having sufficiently high crystallinity is produced. Usually, a satisfactory crystalline zeolite beta can be obtained by heating for approximately 5 to 150 hours.

In the process for producing a zeolite beta according to the present invention, an amorphous component is undesirably produced if the heating time is insufficient. Moreover, if the heating is further continued after crystallization of the zeolite beta is completed, mordenite starts growing, and the proportion of the zeolite beta is reduced. Usually, the time during which only the target zeolite beta stably exists as a single phase depends on the temperature, but is not long. In order to obtain a single phase zeolite beta, the heating is completed before mordenite starts growing, and the sealed container is cooled to end the reaction. In some of Examples described later, a very slight amount of mordenite is produced. If the heating time is made a little shorter in those Examples, a single phase zeolite beta can be surely obtained. Moreover, production of a very slight amount of mordenite does not impair the properties of the zeolite beta, and such a zeolite beta is sufficiently usable.

By the heating, the crystal of the zeolite beta is obtained. After the heating is completed, the produced crystal powder is separated from the mother solution by filtration, washed by water or lukewarm water, and dried. The crystal power in a dry state contains no organic substance, and calcination is unnecessary. The crystal power can be dehydrated and used as an adsorbent or the like. Moreover, in the case where the crystal power is used as a solid acid catalyst, for example, $Na^+$ ion in the crystal is substituted by $NH_4^+$ ion, and the obtained product is calcined. Thus, the crystal power can be used as the $H^+$ type.

Utilizing the large pore size and pore volume and the solid acid properties, the zeolite beta obtained by the present production process is suitably used as catalysts for purging exhaust gas from internal combustion engines such as gasoline engines and diesel engines, adsorption separating agents in a variety of industrial fields, and catalysts in the petroleum chemical industry, for example.

EXAMPLES

Hereinafter, according to Examples, the present invention will be described more in detail. However, the scope of the present invention will not be limited to the Examples. Unless otherwise specified, "%" means "% by weight." The analysis apparatuses used in Examples, Comparative Examples, and Reference Examples below are as follows.

X-ray powder diffractometer: made by MAC Science Co., Ltd., X-ray powder diffractometer MO3, $XHF^{22}$ Cukα ray used, voltage of 40 kV, current of 30 mA, scan step of 0.02°, scan rate of 2°/min Composition analyzer: made by Varian Inc., ICP-AES LIBERTY Series II Scanning electron microscope: made by Hitachi High-Technologies Corporation, field-emission scanning electron microscope S-4800

BET surface area analyzer: Quantachrome Instruments Inc. AUTOSORB-1

REFERENCE EXAMPLE

A zeolite beta having a $SiO_2/Al_2O_3$ ratio of 24.0, a zeolite beta having a $SiO_2/Al_2O_3$ ratio of 18.4, and a zeolite beta having a $SiO_2/Al_2O_3$ ratio of 14.0 were synthesized using tetraethylammonium hydroxide as the SDA and heating with stirring at 165° C. for 96 hours by the conventional known process using sodium aluminate as the alumina source and fine powder silica (Mizukasil P707) as the silica source. These zeolites beta were calcined within an electric furnace at 550° C. for 10 hours while the air was flowed, thereby to produce crystals containing no organic substance.

Figure 2:
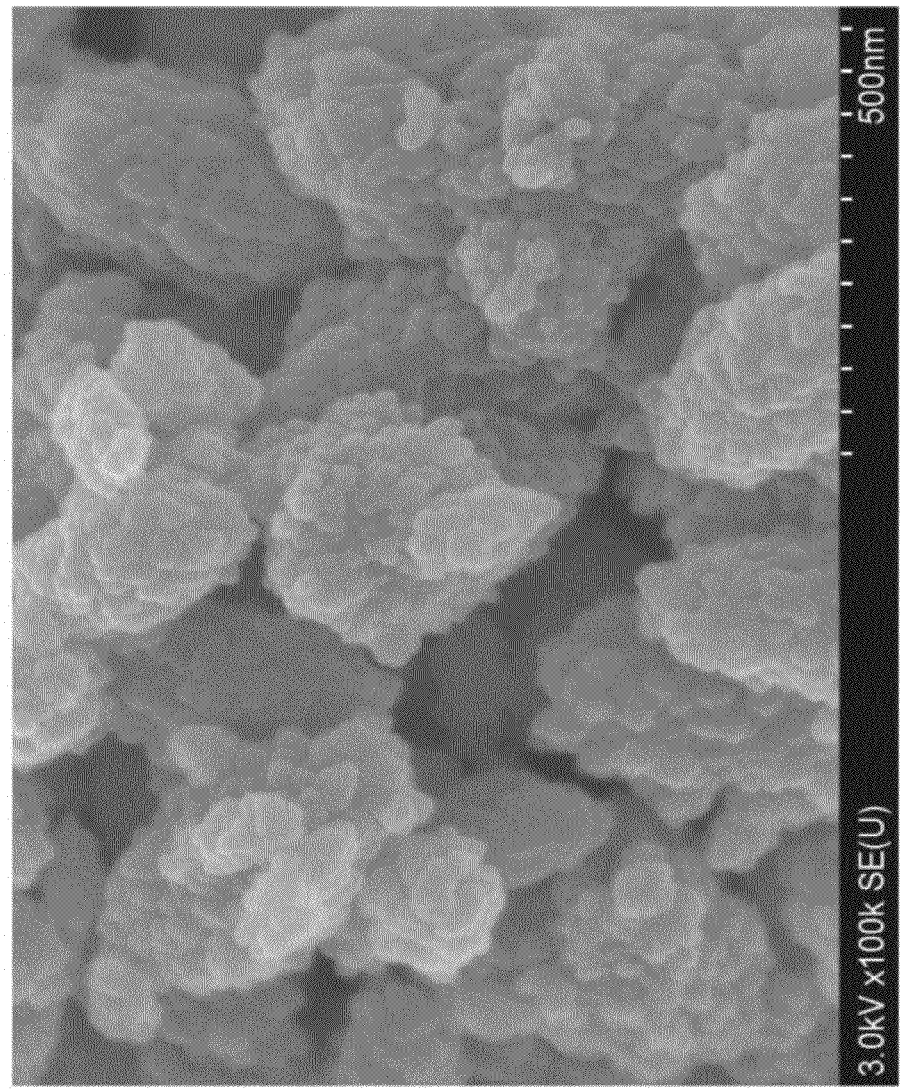
FIG. 2 is a scanning electron microscope image of a zeolite beta used for a seed crystal synthesized in Reference Example and having a $SiO_2/Al_2O_3$ ratio=24.0.
Figure 3:
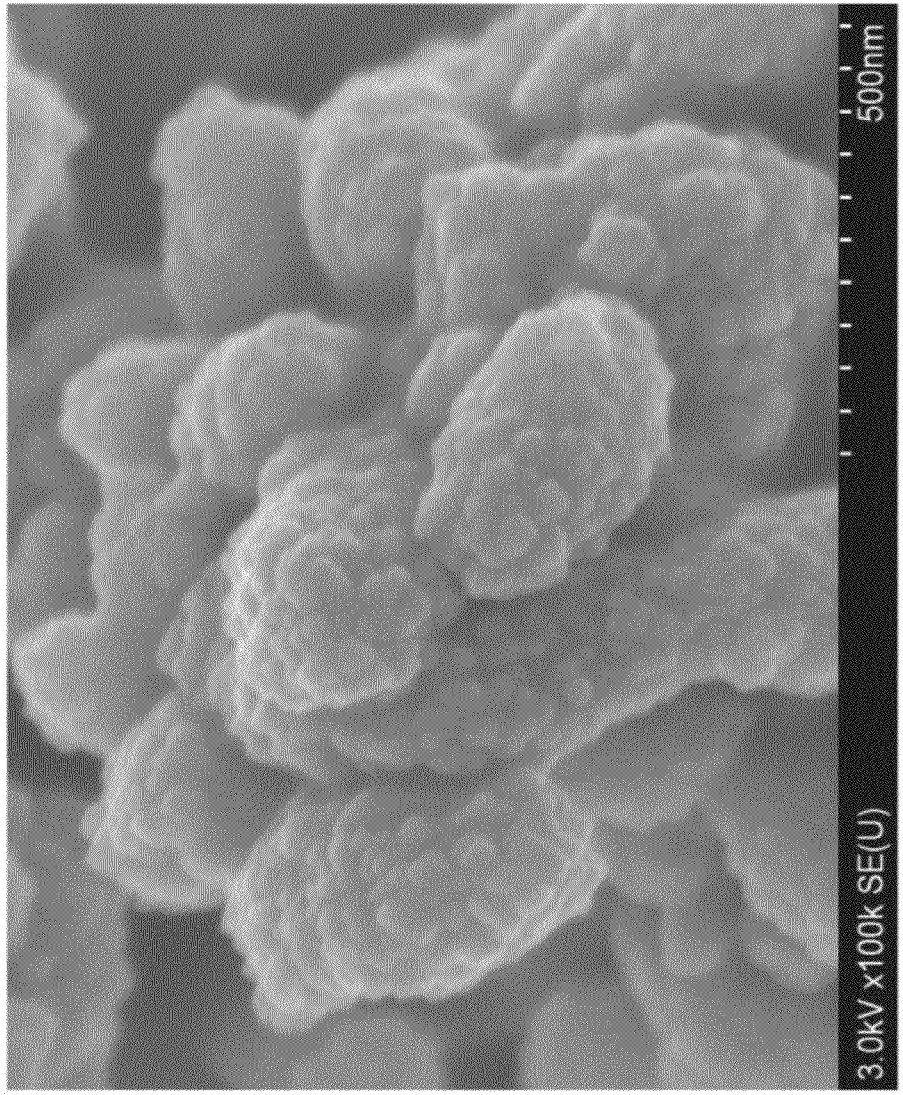
FIG. 3 is a scanning electron microscope image of a zeolite beta used for a seed crystal synthesized in Reference Example and having a $SiO_2/Al_2O_3$ ratio=18.4.
Figure 4:
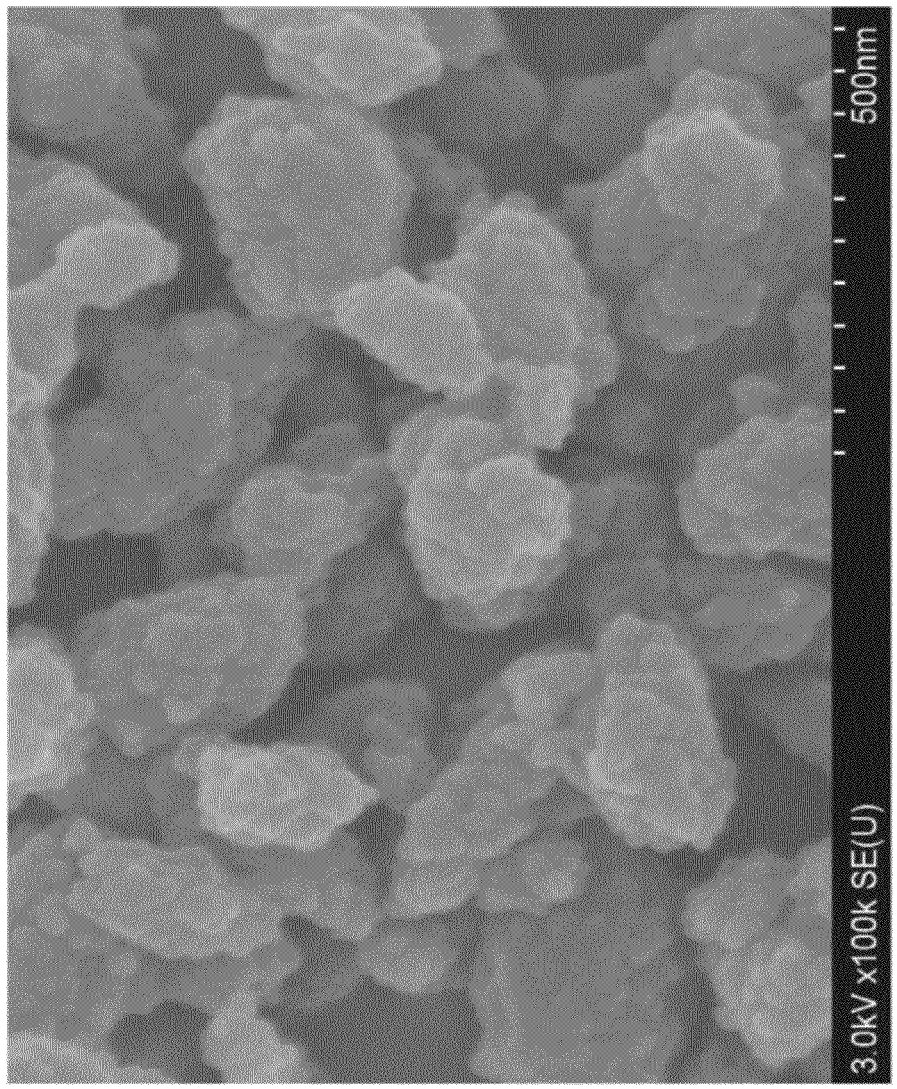
FIG. 4 is a scanning electron microscope image of a zeolite beta used for a seed crystal synthesized in Reference Example and having a $SiO_2/Al_2O_3$ ratio=14.0.
Figure 5:
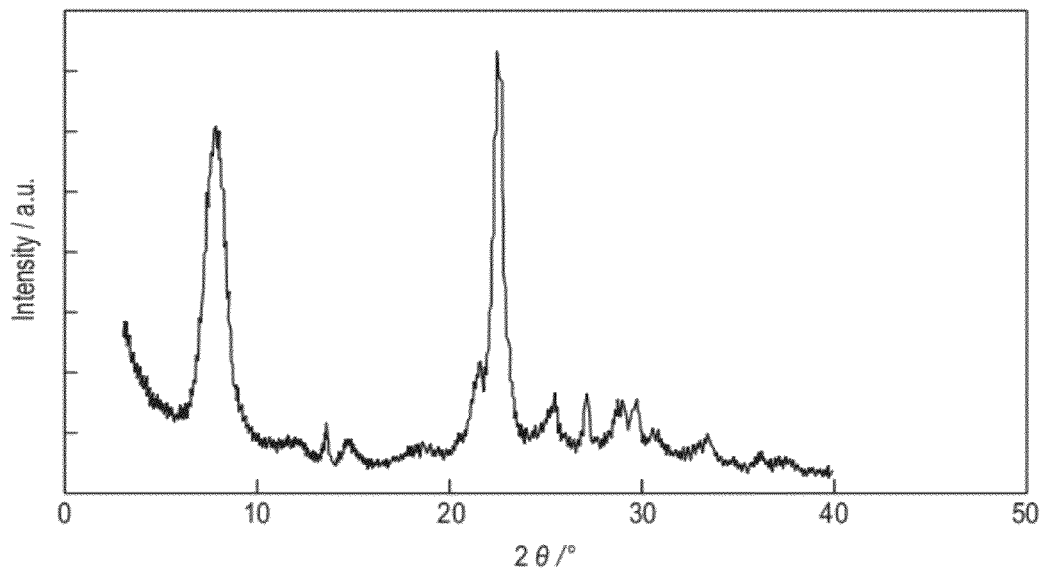
FIG. 5 is an X-ray diffraction diagram of a zeolite beta used for a seed crystal synthesized in Reference Example and having a $SiO_2/Al_2O_3$ ratio=24.0 after calcination.

These crystals were observed with a scanning electron microscope. As a result, the average particle sizes of these crystals were 280 nm ($SiO_2/Al_2O_3$ ratio=24.0), 330 nm (r $SiO_2/Al_2O_3$ ratio=18.4), and 220 nm ($SiO_2/Al_2O_3$ ratio=14.0), respectively. FIG. 2, FIG. 3, and FIG. 4 show the scanning electron microscope images (SEM images) of the crystals, respectively. FIG. 5 shows an X-ray diffraction diagram after the zeolite beta having a $SiO_2/Al_2O_3$ ratio=24.0 is calcined. The crystal of the zeolite beta containing no organic substance was used as the seed crystal in Examples and Comparative Examples described below.

Example 1

Figure 6:
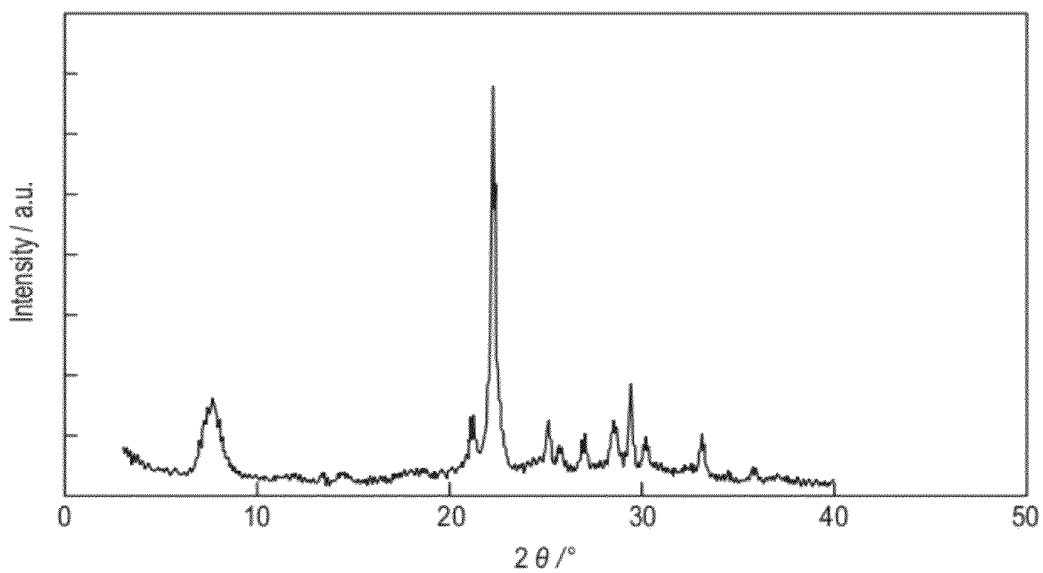
FIG. 6 is an X-ray diffraction diagram of the zeolite beta obtained in Example 1.
Figure 7:
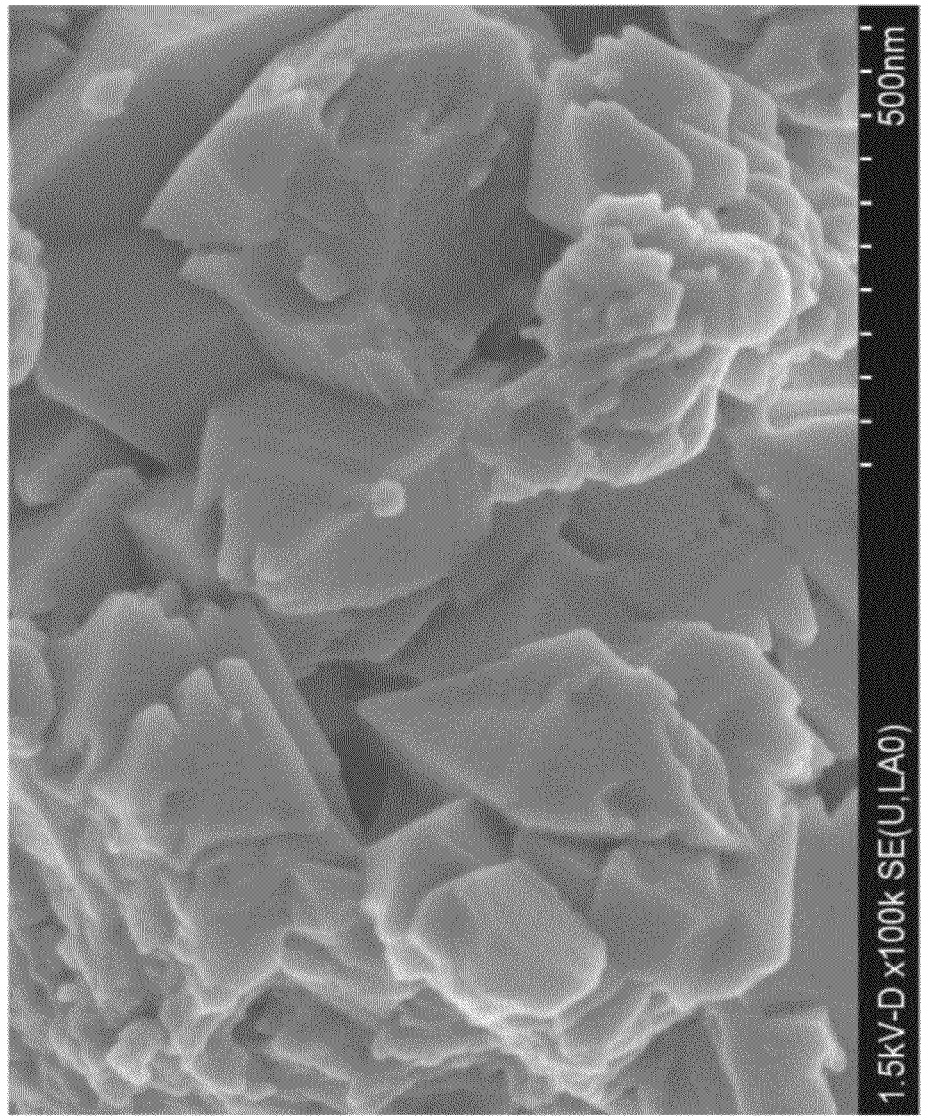
FIG. 7 is a scanning electron microscope image of a zeolite beta obtained in Example 1.

0.235 g of sodium aluminate and 1.828 g of 36% sodium hydroxide were dissolved in 13.9 g of pure water. A mixture of 2.024 g of fine power silica (Cab-O-sil, M-5) and 0.202 g of the zeolite beta seed crystal synthesized in Reference Example and having a $SiO_2/Al_2O_3$ ratio=24.0 was added to the aqueous solution little by little, and stirred and mixed to obtain a reaction mixture having a composition shown in Table 1. The reaction mixture was placed in a 60 cc stainless steel sealed container, and heated with settling 140° C. for 46 hours under autogenous pressure without aging and stirring. After the sealed container was cooled, the product was filtered, and the filtered product was washed by lukewarm water to obtain white powder. FIG. 6 shows the X-ray diffraction diagram of the product. Apparently from the drawing, the product was a zeolite beta containing no impurities. As a result of the analysis of the composition, the $SiO_2/Al_2O_3$ ratio was 11.0. FIG. 7 shows the SEM image. Typical crystal particles have an octahedral shape, and the average particle size was 300 nm.

Example 2

The zeolite beta synthesized in Reference Example and having a $SiO_2/Al_2O_3$ ratio=18.4 was used as the seed crystal. Except that, the same raw materials as those in Example 1 were used to prepare the reaction mixture having the composition shown in Table 1. The reaction mixture was heated on the condition shown in Table 1 without aging and stirring to obtain a product shown in Table 1.

Example 3

The zeolite beta synthesized in Reference Example and having a $SiO_2/Al_2O_3$ ratio=18.4 was used as the seed crystal. Except that, the same raw materials as those in Example 1 were used to prepare the reaction mixture having the composition shown in Table 1. After the reaction mixture was aged at 60° C. for 24 hours, the reaction mixture was heated on the condition shown in Table 1 without stirring to obtain the product shown in Table 1.

Examples 4 and 5

The zeolite beta synthesized in Reference Example and having a $SiO_2/Al_2O_3$ ratio=14.0 was used for the seed crystal. Except that, the same raw materials as those in Example 1 were used to prepare the reaction mixture having the composition shown in Table 1. After the reaction mixture was aged on the condition shown in Table 1 before heating, the reaction mixture was heated on the condition shown in Table 1 without stirring to obtain the product shown in Table 1

Examples 6 to 18

Figure 8:
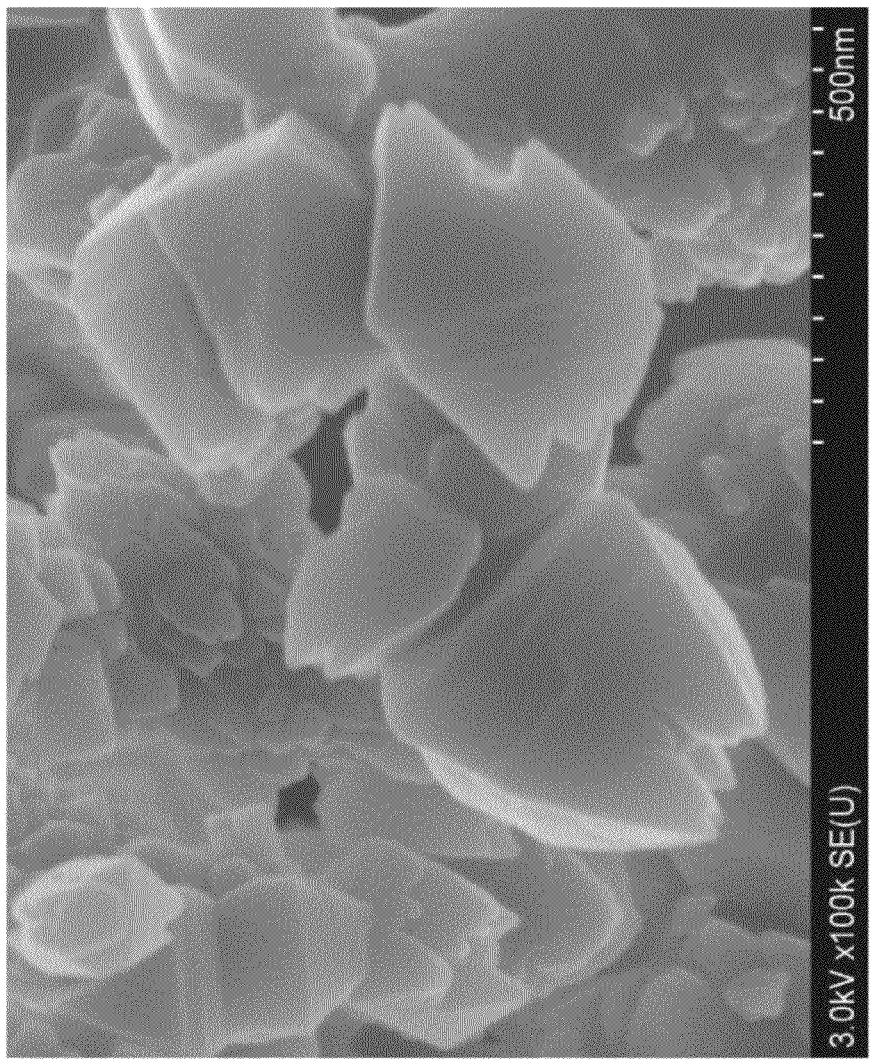
FIG. 8 is a scanning electron microscope image of a zeolite beta obtained in Example 6.
Figure 9:
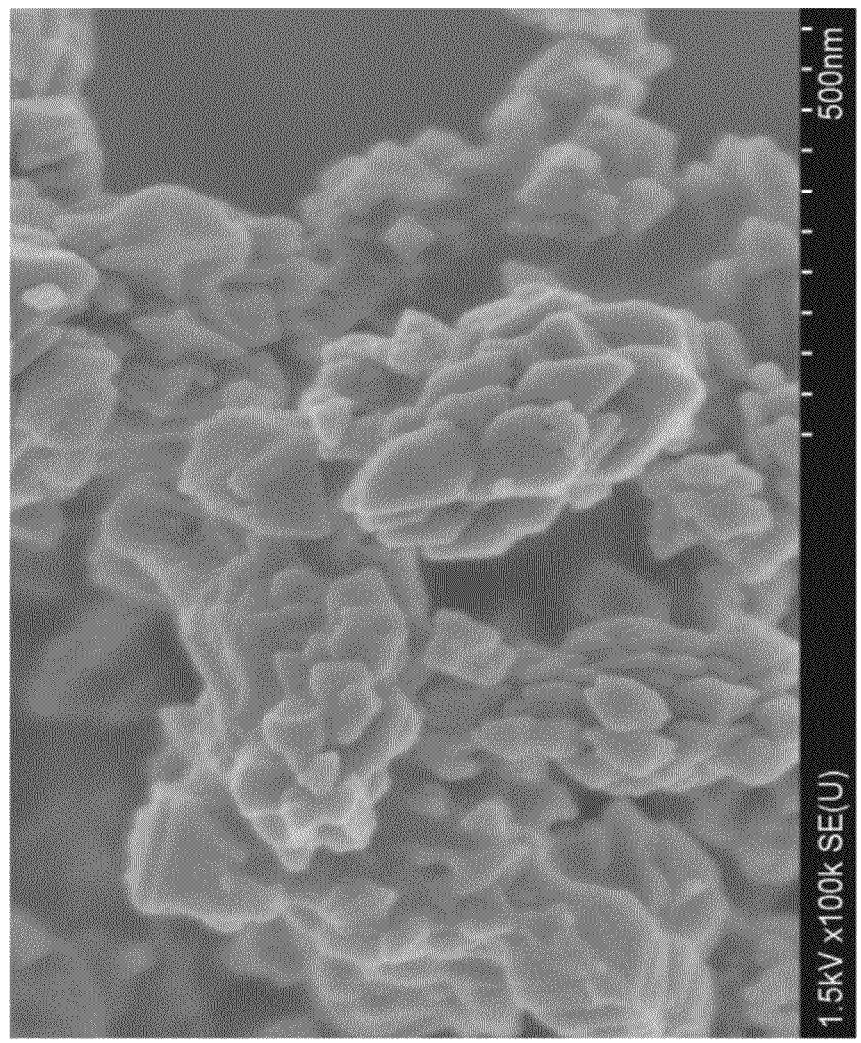
FIG. 9 is a scanning electron microscope image of a zeolite beta obtained in Example 16.
Figure 10:
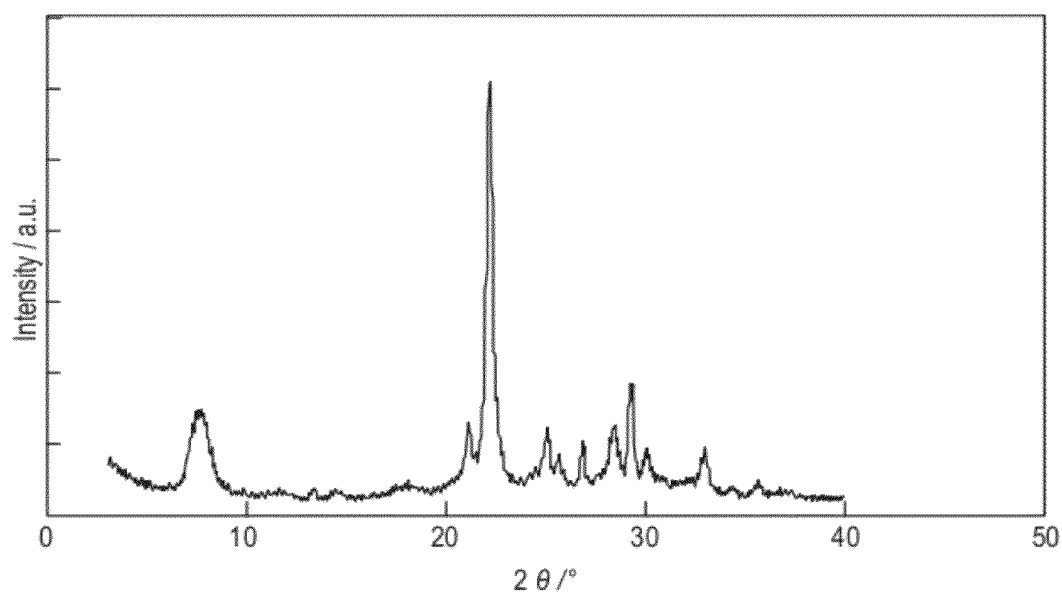
FIG. 10 is an X-ray diffraction diagram of a zeolite beta obtained in Example 18.

The zeolite beta synthesized in Reference Example and having a $SiO_2/Al_2O_3$ ratio=24.0 was used as the seed crystal. Except that, the same raw materials as those in Example 1 were used to prepare the reaction mixture having the composition shown in Table 1. The reaction mixture was heated with settling on the condition shown in Table 1 without aging and stirring to obtain a product shown in Table 1. FIGS. 8 and 9 show the SEM images of the zeolites beta obtained in Examples 6 and 16, respectively. FIG. 10 shows the X-ray diffraction diagram of the product in Example 18. As shown in the drawing, the product obtained in Example 18 was impurities containing no zeolite beta.

Example 19

Figure 11:
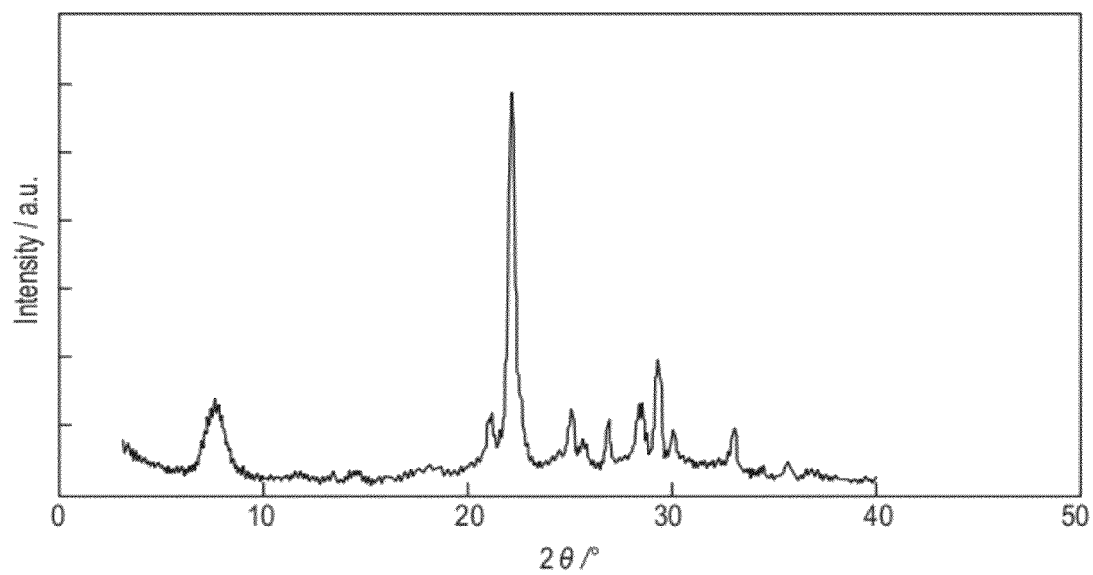
FIG. 11 is an X-ray diffraction diagram of a zeolite beta obtained in Example 19.
Figure 12:
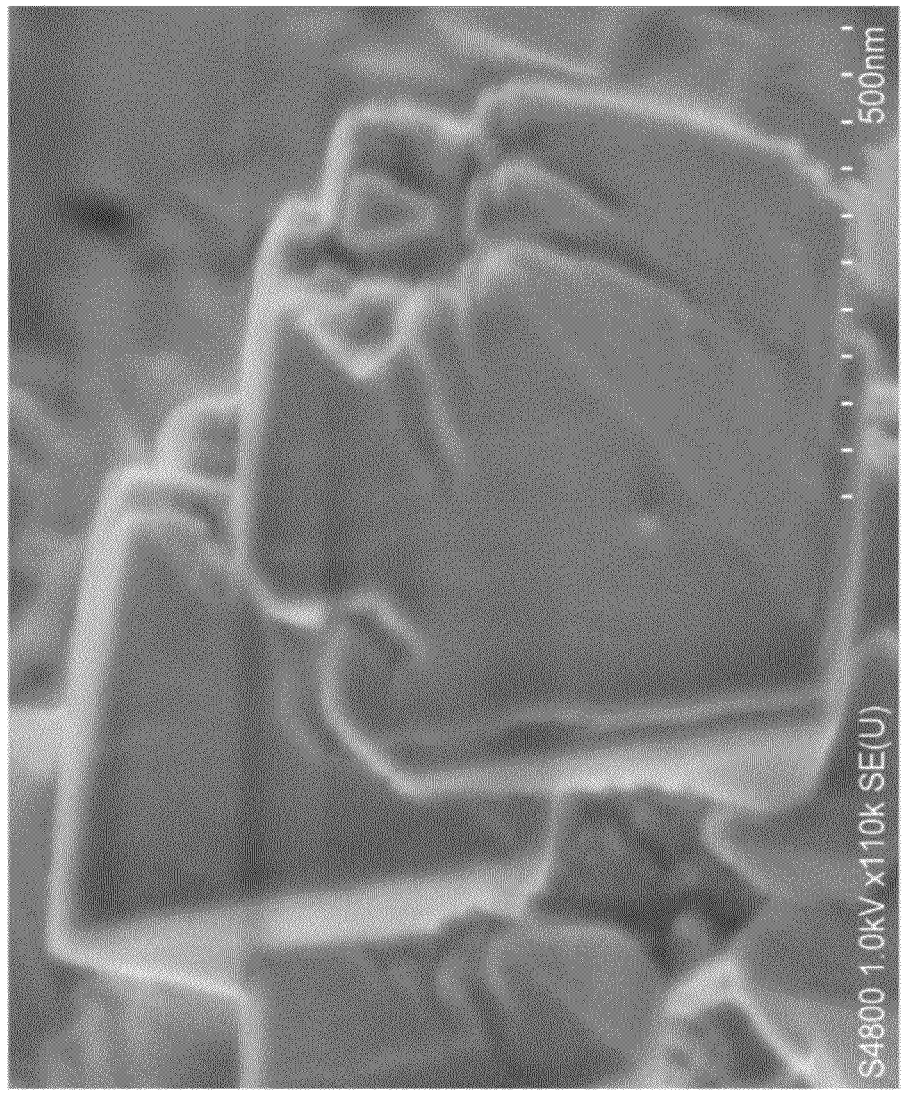
FIG. 12 is a scanning electron microscope image of a zeolite beta obtained in Example 19.

The zeolite beta (average particle size of 300 nm) synthesized in Example 1 and having a $SiO_2/Al_2O_3$ ratio=11.0 was used as the seed crystal. Using the same raw materials as those in Example 1, the reaction mixture having the composition shown in Table 1 was prepared. The reaction mixture was heated with settling on the condition shown in Table 1 without aging and stirring to obtain a product shown in Table 1. FIG. 11 shows the X-ray diffraction diagram of the product. As shown in the drawing, the product was a zeolite beta containing no impurities. FIG. 12 shows the SEM image of the product. Typical crystal particles had an octahedral shape, and the average particle size was 500 nm.

Example 20

The zeolite beta (average particle size of 300 nm) synthesized in Example 1 and having a $SiO_2/Al_2O_3$ ratio=11.0 was used for the seed crystal. Using the same raw materials as those in Example 1, the reaction mixture having the composition shown in Table 1 was prepared. The reaction mixture was aged on the condition shown in Table 1 before heating. Then, while the inside of the sealed container was stirred at 20 rpm, the reaction mixture was heated on the condition shown in Table 1 to obtain a product shown in Table 1.

Example 21

The zeolite beta synthesized in Reference Example and having a $SiO_2/Al_2O_3$ ratio=24.0 was used as the seed crystal. Using the same raw materials as those in Example 1, the reaction mixture having the composition shown in Table 1 was prepared. The reaction mixture was aged on the condition shown in Table 1 before heating. Then, the reaction mixture was heated on the condition shown in Table 1 to obtain a product shown in Table 1.

Examples 22 to 24

The zeolite beta synthesized in Reference Example and having a $SiO_2/Al_2O_3$ ratio=24.0 was used as the seed crystal. Using the same raw materials as those in Example 1 except that the amount of the seed crystal to be added was 5% in Example 22, 2.5% in Example 23, and 1% in Example 24, the reaction mixture having the composition shown in Table 1 was prepared. The reaction mixture was heated with settling on the condition shown in Table 1 without aging and stirring to obtain a product shown in Table 1.

Example 25

The zeolite beta synthesized in Example 18 and having a $SiO_2/Al_2O_3$ ratio=13.2 was used as the seed crystal. Using the same raw materials as those in Example 1, the reaction mixture having the same composition as that in Example 18 shown in Table 1 was prepared. The reaction mixture was heated with settling on the condition shown in Table 1 without aging and stirring to obtain a product shown in Table 1. The SEM image of the product was equivalent to that in FIG. 10.

Example 26

Figure 13:
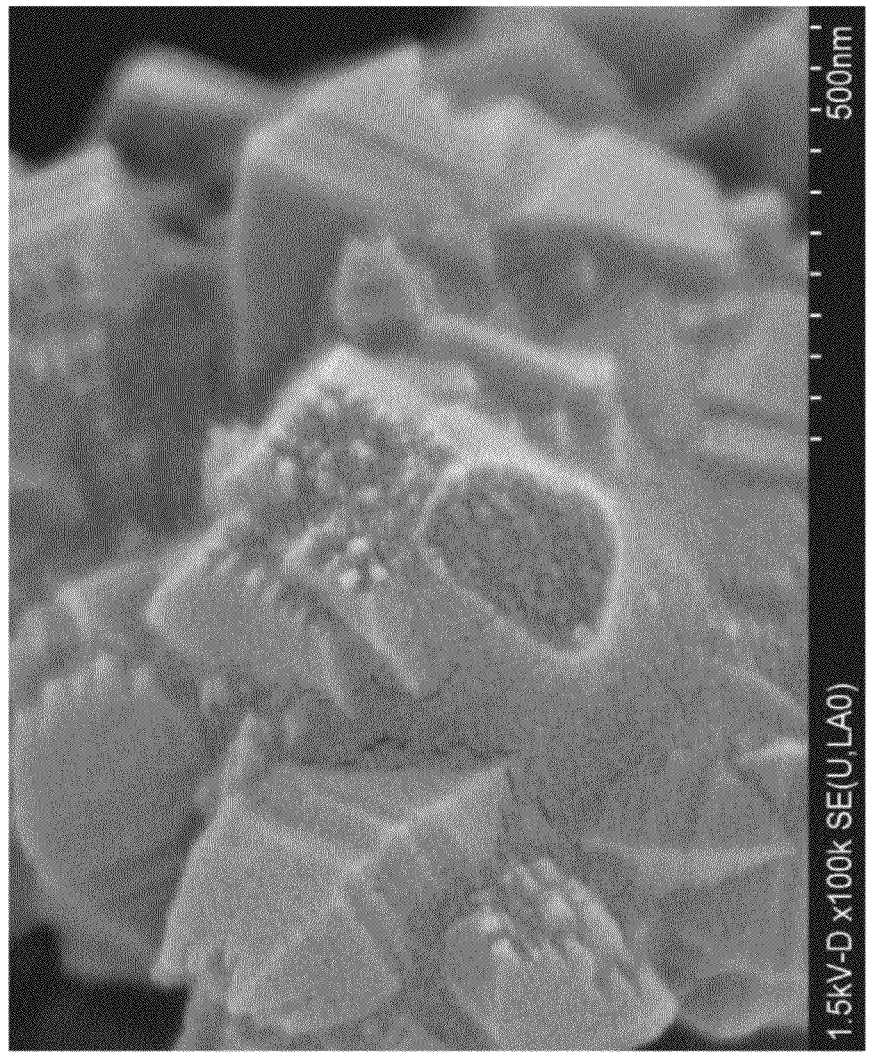
FIG. 13 is a scanning electron microscopic image of a zeolite beta obtained in Example 26.

The zeolite beta synthesized in Example 16 and having a $SiO_2/Al_2O_3$ ratio=11.8 was used as the seed crystal. Using the same raw materials as those in Example 1, the reaction mixture having the same composition as that in Example 16 shown in Table 1 was prepared. The reaction mixture was heated with settling on the condition shown in Table 1 without aging and stirring to obtain a product shown in Table 1. FIG. 13 shows the SEM image of the product.

For comparison, the BET specific surface area, micropore specific surface area, and micropore volume of the zeolite beta obtained in Reference Example above and having a $SiO_2/Al_2O_3$ ratio=24.0 also were measured. As a result, the BET specific surface area was 627 $m^2/g$, the micropore specific surface area was 303 $m^2/g$, and the micropore volume was 0.159 $m^3/g$.

TABLE 1

| Example | Reaction mixture composition | | | Seed crystal | | Aging | | Heating | | Stirring Number of rotation (rpm) | Product | | | | |
|---|---|---|---|---|---|---|---|---|---|---|---|---|---|---|---|
| | $SiO_2/Al_2O_3$ | $Na_2O/SiO_2$ | $H_2O/SiO_2$ | $SiO_2/Al_2O_3$ | Amount to be added*1 (wt%) | Temperature (°C) | Time (h) | Temperature (°C) | Time (h) | | Zeolite | $SiO_2/Al_2O_3$ | BET specific surface area ($m^2/g$) | Specific surface area of micropore ($m^2/g$) | Volume of micropore ($cm^3/g$) |
| 1 | 40 | 0.275 | 25 | 24.0 | 10 | — | — | 140 | 46 | — | Beta | 11.0 | — | — | — |
| 2 | 40 | 0.275 | 25 | 18.4 | 10 | — | — | 140 | 94 | — | Beta + slight amount of mordenite | — | — | — | — |
| 3 | 40 | 0.275 | 25 | 18.4 | 10 | 60 | 24 | 140 | 94 | — | Beta | 12.0 | — | — | — |
| 4 | 40 | 0.275 | 25 | 14.0 | 10 | 30 | 24 | 140 | 120 | — | Beta | — | — | — | — |
| 5 | 40 | 0.275 | 25 | 14.0 | 10 | 60 | 24 | 140 | 120 | — | Beta | 11.0 | — | — | — |
| 6 | 40 | 0.300 | 25 | 24.0 | 10 | — | — | 140 | 46 | — | Beta | 10.8 | 583 | 411 | 0.215 |
| 7 | 40 | 0.325 | 25 | 24.0 | 10 | — | — | 140 | 38 | — | Beta | — | — | — | — |
| 8 | 50 | 0.240 | 24 | 24.0 | 10 | — | — | 140 | 94 | — | Beta | 13.6 | — | — | — |
| 9 | 50 | 0.275 | 24 | 24.0 | 10 | — | — | 140 | 70 | — | Beta + slight amount of mordenite | — | — | — | — |
| 10 | 50 | 0.300 | 24 | 24.0 | 10 | — | — | 140 | 46 | — | Beta + slight amount of mordenite | — | — | — | — |
| 11 | 50 | 0.325 | 24 | 24.0 | 10 | — | — | 140 | 35 | — | Beta | — | — | — | — |
| 12 | 60 | 0.240 | 22 | 24.0 | 10 | — | — | 140 | 82 | — | Beta | — | — | — | — |
| 13 | 60 | 0.275 | 24 | 24.0 | 10 | — | — | 140 | 70 | — | Beta | — | — | — | — |
| 14 | 60 | 0.300 | 22 | 24.0 | 10 | — | — | 140 | 46 | — | Beta + slight amount of mordenite | 12.0 | — | — | — |
| 15 | 70 | 0.300 | 20 | 24.0 | 10 | — | — | 140 | 34 | — | Beta | 12.4 | — | — | — |
| 16 | 70 | 0.325 | 20 | 24.0 | 10 | — | — | 140 | 24 | — | Beta | 11.8 | 601 | 389 | 0.203 |
| 17 | 80 | 0.300 | 20 | 24.0 | 10 | — | — | 140 | 34 | — | Beta | 12.6 | — | — | — |
| 18 | 100 | 0.300 | 20 | 24.0 | 10 | — | — | 140 | 30 | — | Beta | 13.2 | 598 | 394 | 0.206 |
| 19 | 40 | 0.275 | 25 | 11.0*2 | 10 | — | — | 140 | 70 | — | Beta | 12.4 | — | — | — |
| 20 | 40 | 0.275 | 25 | 11.0*2 | 10 | 30 | 24 | 140 | 42 | 20 | Beta | — | — | — | — |
| 21 | 44 | 0.325 | 25 | 24.0 | 10 | 30 | 3 | 140 | 36 | — | Beta | — | — | — | — |
| 22 | 100 | 0.300 | 20 | 24.0 | 5 | — | — | 140 | 30 | — | Beta | — | — | — | — |
| 23 | 100 | 0.300 | 20 | 24.0 | 2.5 | — | — | 140 | 70 | — | Beta | — | — | — | — |
| 24 | 100 | 0.300 | 20 | 24.0 | 1 | — | — | 140 | 100 | — | Beta | 12.2 | — | — | — |
| 25 | 100 | 0.300 | 20 | 13.2*3 | 10 | — | — | 140 | 30 | — | Beta | 12.8 | 600 | 410 | 0.214 |
| 26 | 70 | 0.325 | 20 | 11.8*4 | 10 | — | — | 140 | 38 | — | Beta | 10.6 | 545 | 389 | 0.203 |

*1 Based on the amount of silica in the reaction mixture
*2 Zeolite beta obtained in Example 1
*3 Zeolite beta obtained in Example 18
*4 Zeolite beta obtained in Example 16

Comparative Examples 1 to 3

Using the same raw materials and seed crystal as those used in Example 1, the reaction mixture having the composition shown in Table 2 was prepared. The reaction mixture was heated on the condition shown in Table 2 to obtain a product shown in Table 2.

Comparative Example 4

Using the same raw materials as those used in Example 1, the reaction mixture having the composition shown in Table 2 was prepared. As the seed crystal, a zeolite beta synthesized using tetraethylammonium hydroxide and having a $SiO_2/Al_2O_3$ ratio=40 and an average particle size=130 nm was calcined at 550° C. and used. The reaction mixture was heated on the condition shown in Table 2 to obtain a product shown in Table 2.

TABLE 2

| Comparative Example | Reaction mixture composition | | | Seed crystal | | Aging | | Heating | | Stirring | Product |
| --- | --- | --- | --- | --- | --- | --- | --- | --- | --- | --- | --- |
| | $SiO_2/Al_2O_3$ | $Na_2O/SiO_2$ | $H_2O/SiO_2$ | $SiO_2/Al_2O_3$ | Amount to be added*[1] (wt %) | Temperature (° C.) | Time (h) | Temperature (° C.) | Time (h) | Number of rotation (rpm) | Zeolite |
| 1 | 40 | 0.200 | 25 | 24.0 | 10 | — | — | 140 | 72 | — | Amorphous + mordenite |
| 2 | 30 | 0.275 | 25 | 24.0 | 10 | — | — | 140 | 46 | — | Amorphous |
| 3 | 50 | 0.200 | 25 | 24.0 | 10 | — | — | 140 | 72 | — | Amorphous + mordenite |
| 4 | 40 | 0.275 | 25 | 40.0 | 10 | — | — | 140 | 46 | — | Amorphous + ZSM-5 |

*[1]Based on the amount of silica in the reaction mixture

Example 27

Figure 14:
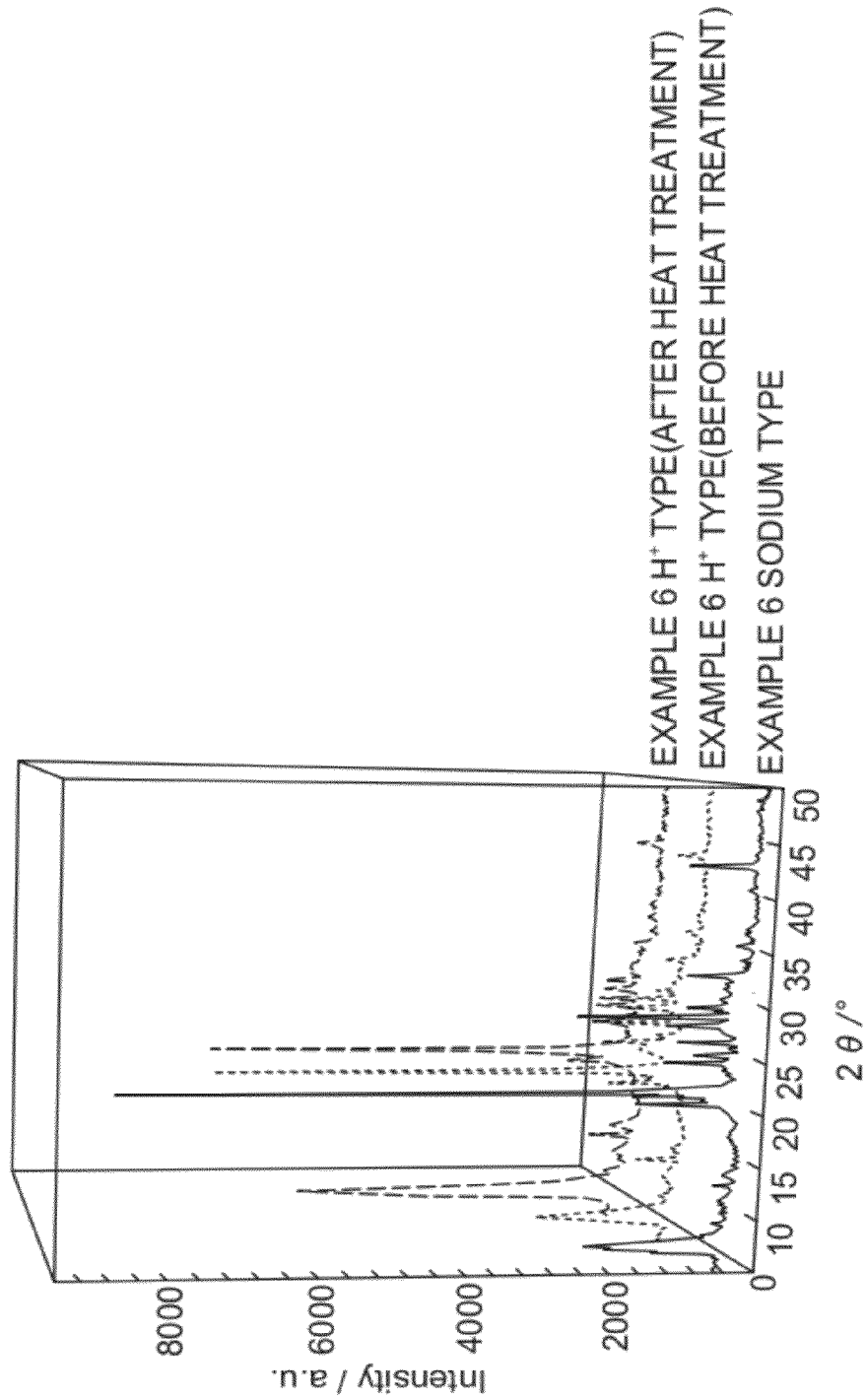
FIG. 14 is an X-ray diffraction diagram of a zeolite beta evaluated in Example 27.

In the present Example, the effectiveness was evaluated when the zeolite beta obtained in Example 6 was used for a catalyst for purging exhaust gas from a gasoline engine. The evaluation was performed on the ability to trap toluene and isooctane as model gases of the exhaust gas and acidity. Several percent of toluene and several percent of isooctane are contained in the exhaust gas, and are principal hydrocarbon components of the exhaust gas. The evaluation method is as follows. The zeolite beta (sodium type) obtained in Example 6 was converted into the $H^+$ type. The evaluation was performed immediately after the conversion and after the hydrothermal treatment. The hydrothermal treatment was performed in order to reproduce the state after the cold start of the gasoline engine. The method for converting a zeolite beta into the $H^+$ type and the hydrothermal treatment are as follows. The results of evaluation are shown in Table 3 below. FIG. 14 shows the X-ray diffraction diagram of the zeolite beta in the sodium type and the zeolite beta before the hydrothermal treatment and that after the hydrothermal treatment.

[Preparation of $H^+$ Type Zeolite Beta]

The sodium type zeolite beta (1 g) obtained in Example 6 was placed in a polypropylene container and dispersed in a 2 mol/L ammonium nitrate aqueous solution (30 ml). The dispersion was kept at 80° C. for 24 hours. Subsequently, the dispersion was filtered. Then, the filtered product was washed by a sufficient amount of distilled water, and dried at 100° C. overnight. The thus-obtained ammonium type zeolite beta was heated from room temperature to 500° C. in a muffle furnace. The temperature was kept for 2 hours to convert the zeolite beta to the $H^+$ type. Subsequently, the $H^+$ type was kept under the air flow at 500° C. for 3 hours.

[Hydrothermal Treatment]

The $H^+$ type zeolite beta was subjected to a hydrothermal treatment under the air flow containing 10% of steam (flow rate of 25 ml/min) at 800° C. for approximately 5 hours.

[Ability to Trap Toluene and Isooctane]

In order to evaluate the ability to trap hydrocarbons, temperature programmed desorption (TPD) was performed with a gas chromatograph including a thermal conductivity detector (TCD) (made by SHIMADZU Corporation, GC-9A) using toluene and isooctane as probe molecules. Approximately 20 g of the $H^+$ type zeolite beta (before and after the hydrothermal treatment) was placed in a quartz tube having an inner diameter of 4 mm and held between quartz wool and glass beads. Using helium (flow rate of 30 ml/min) as a mobile phase, the sample was activated at 390° C. for approximately 1 hour. After the column was cooled to 50° C., toluene was injected until toluene reached the saturated state (pulse method). Toluene was desorbed by raising the temperature of the column at 10° C./min from 50° C. to 390° C., and keeping 390° C. for 10 minutes. (W/F: approximately $10^{-4}$ g·min/cm$^3$). The same operation was performed on isooctane.

[Acidity]

The acidity was measured by using a BEL-CAT apparatus (BEL Japan, Inc.) and performing the temperature programmed desorption of the $NH_3$. Using He (flow rate of 30 ml/min) as a mobile phase, the $H^+$ type zeolite beta (before and after the hydrothermal treatment) was pre-treated at 600° C. for approximately 1 hour. Next, under a He atmosphere containing 5 vol % of $NH_3$, $NH_3$ was adsorbed at 100° C. for 10 minutes. Then, the desorption behavior of $NH_3$ was observed by the thermal conductivity detector (TCD) while the temperature of the sample was raised from room temperature to 600° C. at 10° C./min.

Examples 28 and 29

Figure 15:
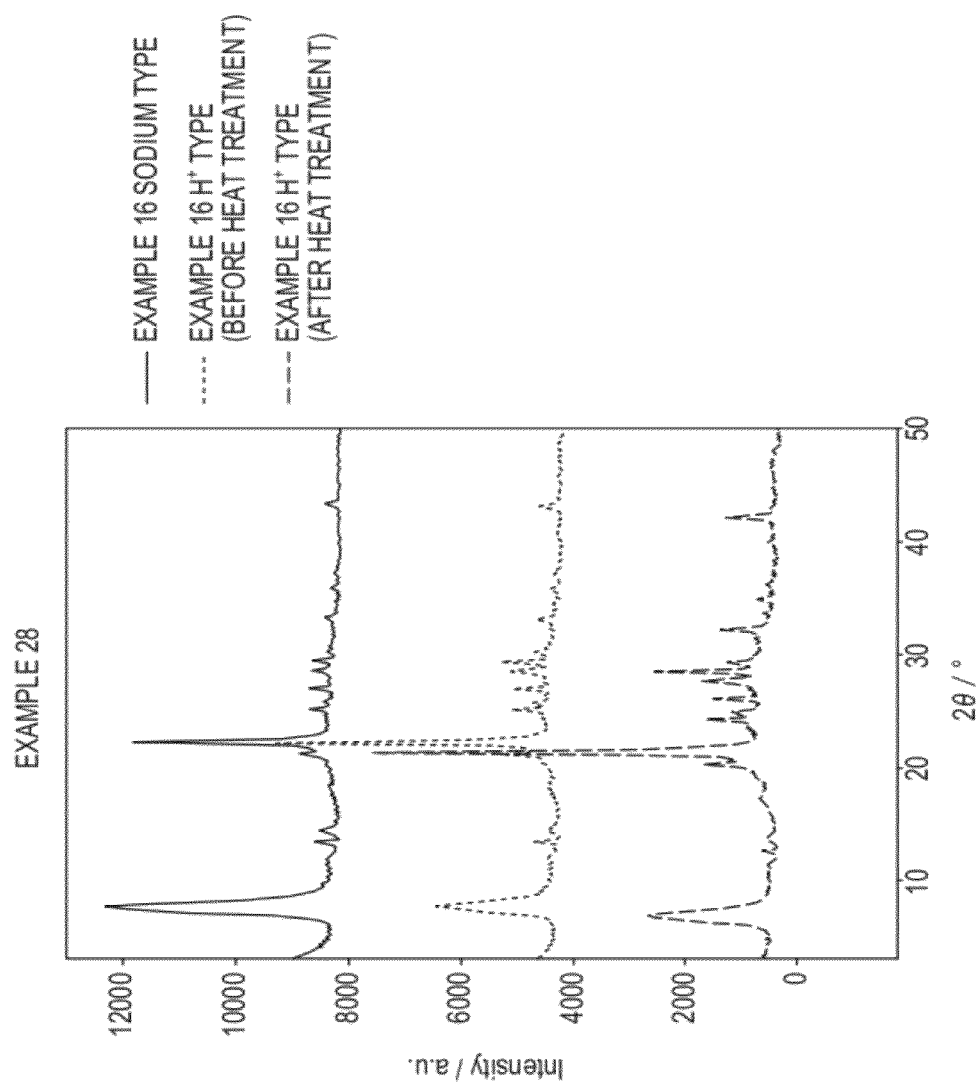
FIG. 15 is an X-ray diffraction diagram of a zeolite beta evaluated in Example 28.
Figure 16:
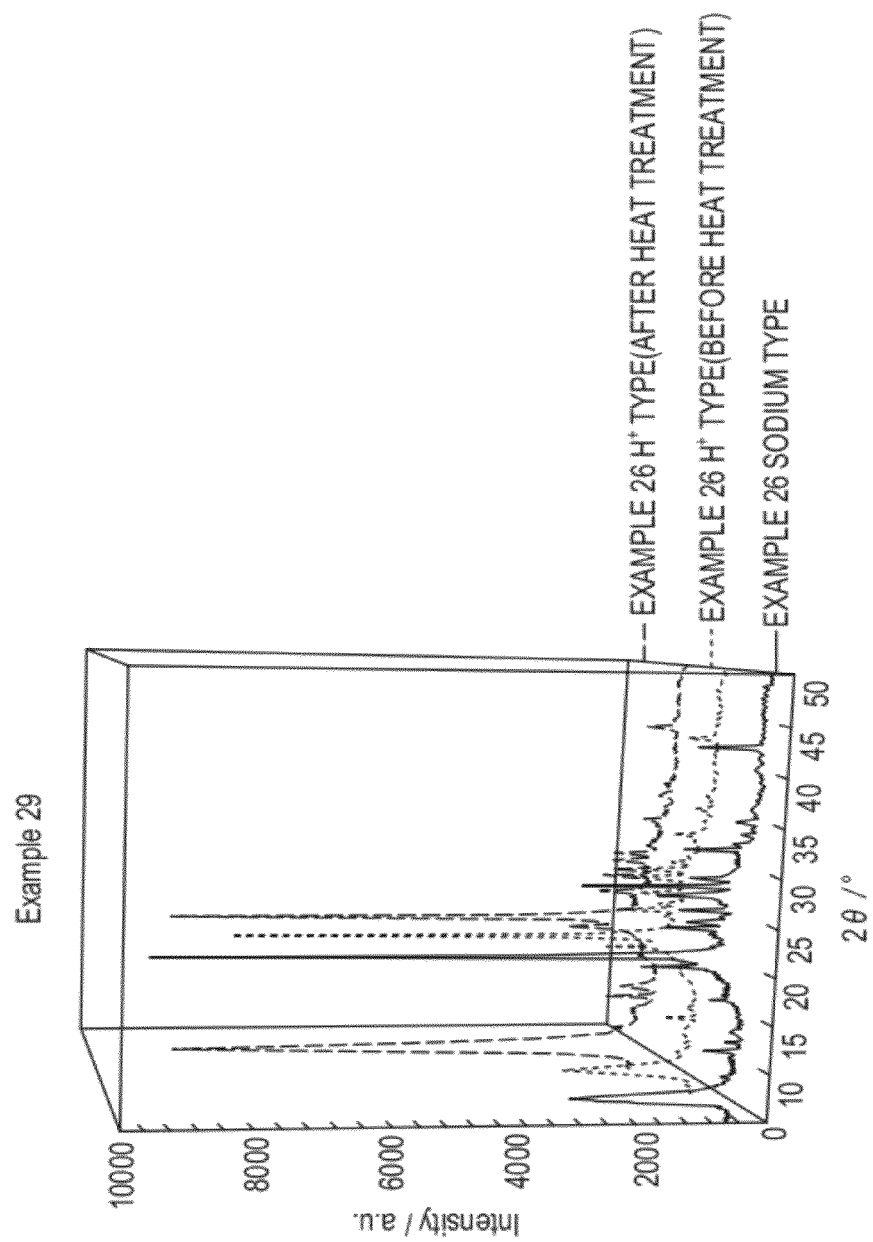
FIG. 16 is an X-ray diffraction diagram of a zeolite beta evaluated in Example 29.

The zeolites beta obtained in Examples 16 and 26 were evaluated in the same manner as in Example 27. The results are shown in Table 3 below. FIG. 15 (Example 28) and FIG. 16 (Example 29) show the X-ray diffraction diagram of the sodium type zeolite beta and the zeolite beta before the hydrothermal treatment and that after the hydrothermal treatment.

TABLE 3

| | | BET specific surface area (m²/g) | Specific surface area of micropore (m²/g) | Volume of micropore (cm³/g) | $SiO_2/Al_2O_3$ | Amount of hydrocarbons to be trapped (cm³/g) | | Acidity (mmol/g) |
| --- | --- | --- | --- | --- | --- | --- | --- | --- |
| | | | | | | Toluene | Isooctane | |
| Example 27 | Before hydrothermal treatment | 539 | 335 | 0.175 | 10.6 | 0.051 | 0.081 | 1.38 |
| | After hydrothermal treatment | 424 | 247 | 0.129 | 11.2 | 0.087 | 0.109 | 0.3 |
| Example 28 | Before hydrothermal treatment | 576 | 364 | 0.192 | 11.4 | 0.073 | 0.102 | 1.66 |
| | After hydrothermal treatment | 424 | 257 | 0.136 | 10.4 | 0.096 | 0.117 | 0.49 |

TABLE 3-continued

|  |  | BET specific surface area (m²/g) | Specific surface area of micropore (m²/g) | Volume of micropore (cm³/g) | SiO$_2$/Al$_2$O$_3$ | Amount of hydrocarbons to be trapped (cm³/g) | | Acidity (mmol/g) |
|---|---|---|---|---|---|---|---|---|
|  |  |  |  |  |  | Toluene | Isooctane |  |
| Example 29 | Before hydrothermal treament | 479 | 310 | 0.162 | 10.4 | 0.059 | 0.07 | 1.39 |
|  | After hydrothermal treament | 380 | 225 | 0.118 | 10.2 | 0.073 | 0.087 | 0.31 |

Apparently from the result shown in Table 3, it is found that the zeolite beta according to the present invention has the ability to trap hydrocarbons. Particularly, note that by the hydrothermal treatment of the zeolite beta, the ability to trap hydrocarbons is improved compared to that before the hydrothermal treatment.

The invention claimed is:

1. A zeolite beta having a SiO$_2$/Al$_2$O$_3$ ratio of 10 to 16, wherein
a BET specific surface area measured in the state of a sodium type is 500 to 700 m²/g, a micropore specific surface area is 350 to 500 m²/g, and a micropore volume is 0.15 to 0.25 cm³/g.

2. A process for producing a zeolite beta, comprising the steps of:
(1) mixing a silica source, an alumina source, an alkali source, and water to obtain a reaction mixture having a composition represented by molar ratios below:
SiO$_2$/Al$_2$O$_3$=40 to 200
Na$_2$O/SiO$_2$=0.22 to 0.4
H$_2$O/SiO$_2$=10 to 50,
(2) adding a zeolite beta having a SiO$_2$/Al$_2$O$_3$ ratio of 8 to 30 and containing no organic compound having an average particle size of not less than 150 nm used as a seed crystal to the reaction mixture in a proportion of 0.1 to 20% by weight based on the silica component in the reaction mixture, and
(3) hermetically heating the reaction mixture containing the seed crystal added to 100 to 200° C.

3. The process for producing a zeolite beta according to claim 2, comprising the steps of:
(1) mixing a silica source, an alumina source, an alkali source, and water to obtain a reaction mixture having a composition represented by molar ratios below:
SiO$_2$/Al$_2$O$_3$=44 to 200
Na$_2$O/SiO$_2$=0.24 to 0.35
H$_2$O/SiO$_2$=15 to 25,
(2) adding a zeolite beta having a SiO$_2$/Al$_2$O$_3$ ratio of 8 to 30 and containing no organic compound having an average particle size of not less than 150 nm used as a seed crystal to the reaction mixture in a proportion of 0.1 to 20% by weight based on the silica component of the reaction mixture, and
(3) hermetically heating the reaction mixture containing the seed crystal added to 120 to 180° C.

4. The production process according to claim 2, wherein the zeolite beta produced by the production process according to claim 2 is used as the seed crystal.

5. The production process according to claim 2, wherein the reaction mixture is aged under a temperature of 20 to 80° C. before heating the reaction mixture.

6. The production process according to claim 2, wherein the reaction mixture is stirred in the step of hermetically heating the reaction mixture.

7. A catalyst for purging exhaust gas for internal combustion engines, the catalyst comprising the zeolite beta according to claim 1.

* * * * *